United States Patent [19]

Blake

[11] 3,715,487

[45] Feb. 6, 1973

[54] PARABOLA GENERATOR MOVING ERROR CORRECTOR

[75] Inventor: James E. Blake, Liverpool, N.Y.

[73] Assignee: General Electric Company

[22] Filed: Oct. 29, 1971

[21] Appl. No.: 193,887

[52] U.S. Cl.................178/7.3 R, 328/165, 328/127, 328/144, 307/229

[51] Int. Cl...........................................H03b 1/00

[58] Field of Search......307/229, 230, 235; 328/127, 328/128, 150, 165, 142, 144; 178/7.3 R

[56] References Cited

UNITED STATES PATENTS 3,484,594 12/1969 Gilbert et al.....................328/127 X

OTHER PUBLICATIONS

IBM Tech. Discle. Blltn. Integrating Amplifier with AC Common Mode Noise Rejection by Benson et al. Vol. 10, No. 8, 1/69, page 1150.

*Primary Examiner*—Herman Karl Saalbach
*Assistant Examiner*—B. P. Davis
*Attorney*—Michael Masnik et al.

[57] ABSTRACT

A circuit for producing a parabola waveform which comprises a differential input integrator receiving a ramp waveform at a first input and employs a feedback circuit including a peak detector connected to its second input. Any departure of the vertical rate parabola from steady-state conditions, caused by introducing a DC component into the first input, is thus detected in the form of an error voltage at the second input of the integrator, thereby cancelling out the DC component to prevent its having any effect on the output signal.

7 Claims, 4 Drawing Figures

PARABOLA GENERATOR MOVING ERROR CORRECTOR

This invention relates to integrating circuits for recurrent electrical signals and particularly to arrangements for eliminating the effects of an undesirable DC electrical component which may be introduced into the respective signals being applied to the integrating circuit.

In the field of television, it is oftentimes desirable to display a plurality of different video signals on the same screen on a time-sharing basis. The borders between the two video signals are in the form of geometric patterns, such as circles, squares, triangles, etc. A common geometric pattern is the circle.

In order to switch one video signal in and another one out of the display at the proper time corresponding to a desired point, say on the boundary of a circular pattern, switching signals must be generated. A common way to generate these switching signals is to employ a mixture of parabolic waveforms for establishing the points of switching at the required horizontal and vertical coordinates on the TV raster. The mixture comprises a single parabola for the horizontal coordinates of a single field of raster scan and 256 ½ constant amplitude parabolas for the vertical coordinates of a single field which are superimposed on the horizontal coordinate parabola. By applying this mix of parabolas to a threshold detector, such as a Schmitt trigger, the instantaneous amplitude of the mix of parabola signals is compared with the threshold level of the detector. Each comparison which yields an identity of amplitudes results in a switching signal for switching the video signals. Changes in circle size are established by changing the threshold level of the detector. To vary the positioning of the circle on the raster, use is made of a manual, positioner control to vary the starting time of the mix of parabolas with respect to the TV system horizontal and vertical sweeps. A common positioner is a joy stick or handle arrangement which can be moved in a desired angular direction and a desired distance or range from a central position. The selected angle and distance values control the position of the center of the circle on the raster. One problem with this arrangement, however, is that movement of the positioner causes a DC electrical signal component to be generated during the period of movement of the positioner. This undesirable component has an amplitude related to the rate of change of the positioner and a polarity related to the direction in which the positioner is moved.

The DC component is undesirable particularly with respect to the parabolas associated with the vertical coordinates. It results in changes in circle size with positioner movement because the size of the circle is dependent upon the comparative amplitudes of the mix of parabola signals and the detector threshold level, and the added DC component modifies the point at which identity of amplitudes is detected. Previous systems have attempted to overcome this difficulty by filtering out any DC added to the input waveform before it is integrated. This has involved considerable complexity, critical dimensioning of parts and undesirable results. There exists a need, therefore, for an improved arrangement to minimize circle size changes when the positioner is being adjusted.

One object of this invention is to provide an improved arrangement for minimizing circle size changes attributable to positioner movement in a special effects TV video switching system.

Another object of this invention is to provide an improved signal processing arrangement.

A further object of this invention is to provide an arrangement for modifying the time occurrence of a ramp waveform used in producing special effect signals for television video switching while minimizing the effect of undesirable signals produced as a result of the modification.

A further object is to produce a parabolic waveform from a ramp waveform while minimizing the effect of undesirable DC components which may be associated with the ramp waveform as its time of occurrence is changed.

Briefly, in accordance with one embodiment of the invention, there is provided a source of recurrent ramp input waveform normally having a zero DC signal component, means are provided for integrating said ramp input waveform to produce a recurrent parabolic output waveform. A positioner means is provided for modifying the time of occurrence of the parabola in said produced recurrent parabolic output waveform. Where said ramp timing modification produces an undesirable ramp component in said modified parabolic output waveform, means are provided for eliminating said produced undesirable ramp component. This comprises means responsive to said modified parabolic output waveform with the undesirable ramp component for providing an inverted version thereof, and means for peak detecting said inverted version to produce a DC feedback signal whose amplitude and polarity are a function of the rate and direction of positioner movement respectively. Finally, means are provided for applying said feedback signal to said integrator to eliminate the undesirable component.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

Figure 1:
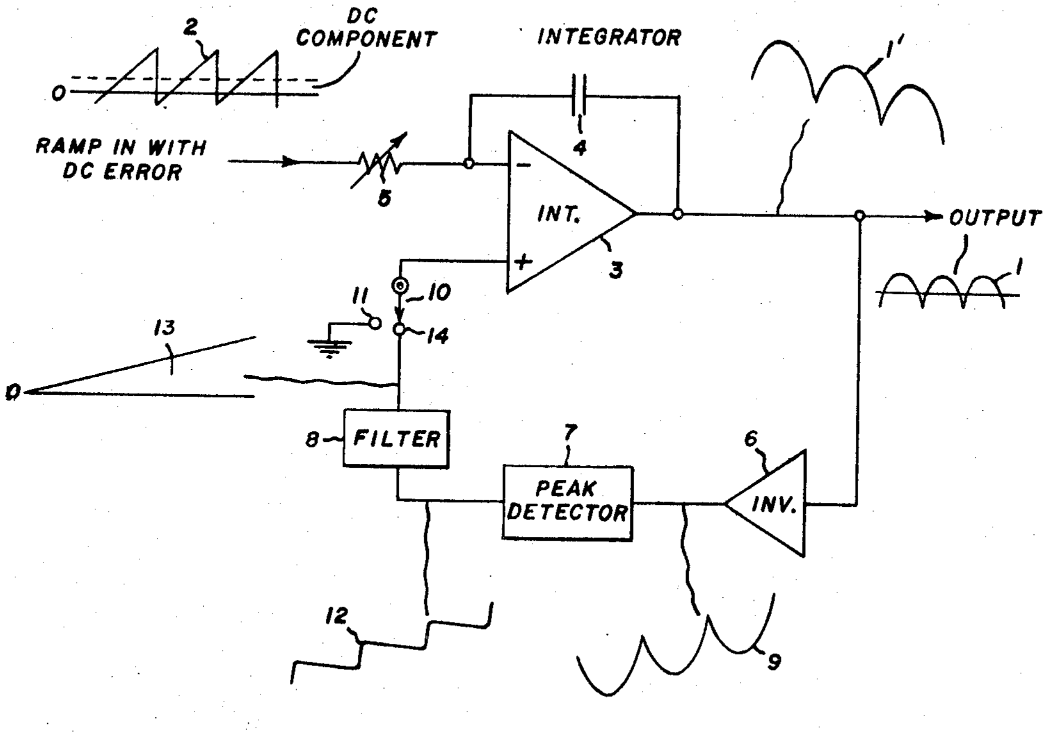
FIG. 1 illustrates in block diagram form an embodiment of the present invention.

Referring to FIG. 1, there is shown an arrangement for producing an output parabolic waveform 1 in response to an applied input waveform 2 utilizing an integrator circuit 3. If the output repetitive ramp waveform 2 is an AC waveform centered about a zero voltage value, the output waveform will be a parabola without any undesirable DC component. However, if the input waveform 2 has a DC component, the integrator will operate on this DC component to produce a DC ramp component in the output waveform such that the resulting parabolas being generated are superimposed on an inverted ramp as shown at 1'. The integrator shown is a differential amplifier connected in an integrator configuration utilizing a capacitor and resistance network comprising elements 4 and 5. By controlling the value of the resistance 5 we can control the amplitude of the parabola.

In order to eliminate the undesirable ramp component in the output waveform 1 attributable to the undesirable component occurring with the input waveform 2, applicant employs a feedback network comprising inverter 6, peak detector 7 and filter 8. The inverter 6 responds to the output waveform 1' carrying the undesirable ramp component to produce inverted parabolic waveforms superimposed on an inverted ramp as shown at 9. For purposes of discussion, let us assume that the switch 10 is open by movement to 11 so that the + input to the differential integrator is grounded and not receiving a feedback signal from 8. The output of the peak detector will then be as shown at 12 which after filtering in 8 produces the ramp waveform 13. This output of filter 8 when applied to the + input of integrator 3, with switch 10 moved to its closed position 14 operates to cancel the undesirable DC ramp component of the output waveform and produce output wave 1. It should be noted that when the differential amplifier is operating with the feedback signal loop closed, the waveforms are substantially modified to the extent that the error signal in the feedback loop and being applied to the + input of 3 has been reduced to a low level sufficient to maintain the desired results.

Figure 2:
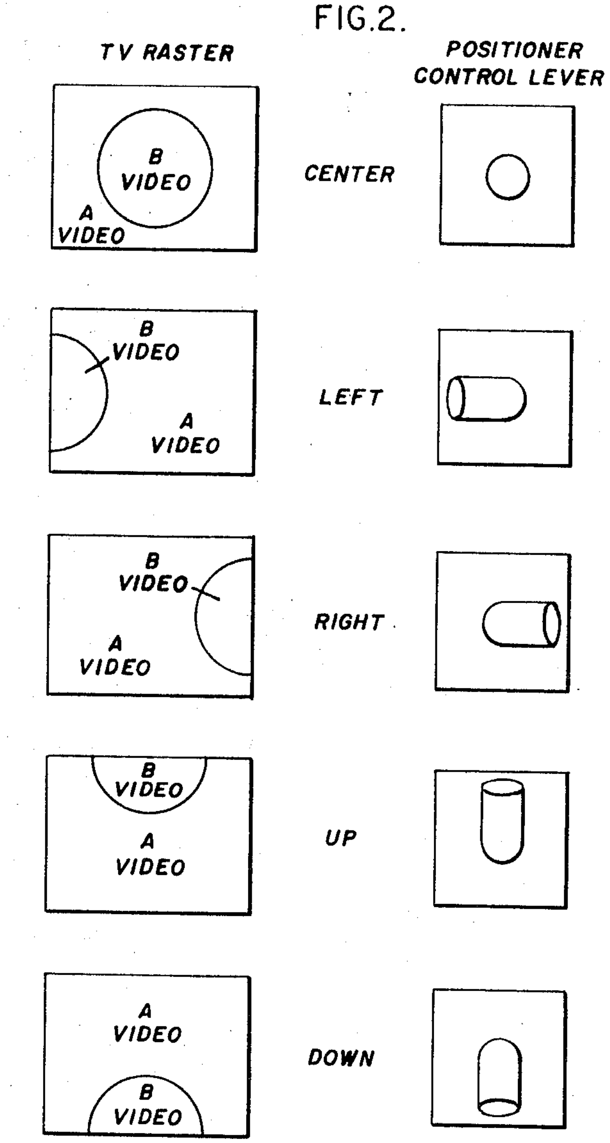
FIG. 2 illustrates schematically the effect of a movement of a positioner control which controls timing of electrical signals produced by the arrangement of FIG. 1.

Thus, in this manner, the desired parabolic waveforms can be generated without the undesirable ramp component which tends to cause undesirable changes in special effect signals, such as the aforementioned circular patterns. As mentioned previously, the position of the circular video patterns on the raster can be controlled with a control lever. Referring to FIG. 2, there is shown the type of control possible by movement of the control lever. Movement of the control in the direction and to the degree indicated produces movement of the circle representing the border line between the two video signals to various positions on the TV raster.

Figure 3:
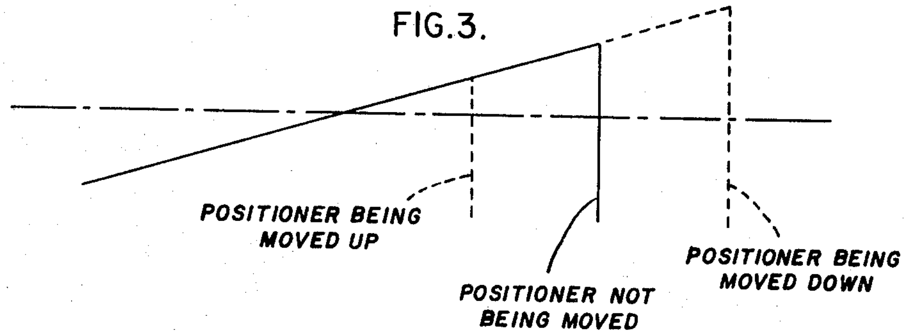
FIG. 3 is waveforms explanatory of the undesirable effects associated with positioner movement.

FIG. 3 illustrates graphically the manner in which the undesirable DC component is generated with movement of the positioner control lever. As background, it should be noted that the ramp signal is produced in a ramp signal generator which is triggered with input pulses. These input pulses are derived from the television sync signals controlling horizontal and vertical sweeps. In one arrangement, the trailing edge of a first sync pulse initiates the start of the ramp signal and the leading edge of the next succeeding pulse terminates the ramp signal. In order to vary the time of occurrence or timing of the start of the ramp signal with respect to the sync signals associated with horizontal and vertical sweeps, it is necessary to delay the start and stop signals being applied to the ramp generator. In one particular arrangement, the television synchronizing signals are applied through a delay circuit to the generator. By varying the time delay introduced by this delay circuit, the start of each ramp can be modified with the time of occurrence of the television sync signals. One common way of adjusting the delay, of course, is the use of the positioner control lever. Movement of the control lever varies the charging rate of a time constant used in the delay circuit, for example a multivibrator, to change the time of delay of the output from the delay circuit in accordance with the lever setting. The nature of the lever is such that the delay circuit is modified in accordance with both the angle in which the lever is moved as well as the degree of displacement that it undergoes from its central position. In effect, the timing of the resultant waveform is varied in accordance with the X and Y-coordinates associated with lever movement.

Referring to FIG. 3, the solid ramp waveform shown centered around the zero voltage axis indicates that the positioner is in a fixed setting. However, if as the ramp is being generated the positioner is moved, it should be noted that the duration of the ramp waveform is modified. Movement in one direction produces a shortening of the ramp waveform substantially during the period of movement and movement in another direction produces an extension of the duration of the ramp waveform. The nature of this change in the ramp duration is to provide a nonsymmetrical ramp centered about the zero axis, that is, it introduces an undesirable DC component. As previously mentioned, this undesirable DC component, which has a polarity depending on the direction in which the lever is moved, produces an undesirable ramp component in the parabola output waveform 1' shown in FIG. 1.

Figure 4:
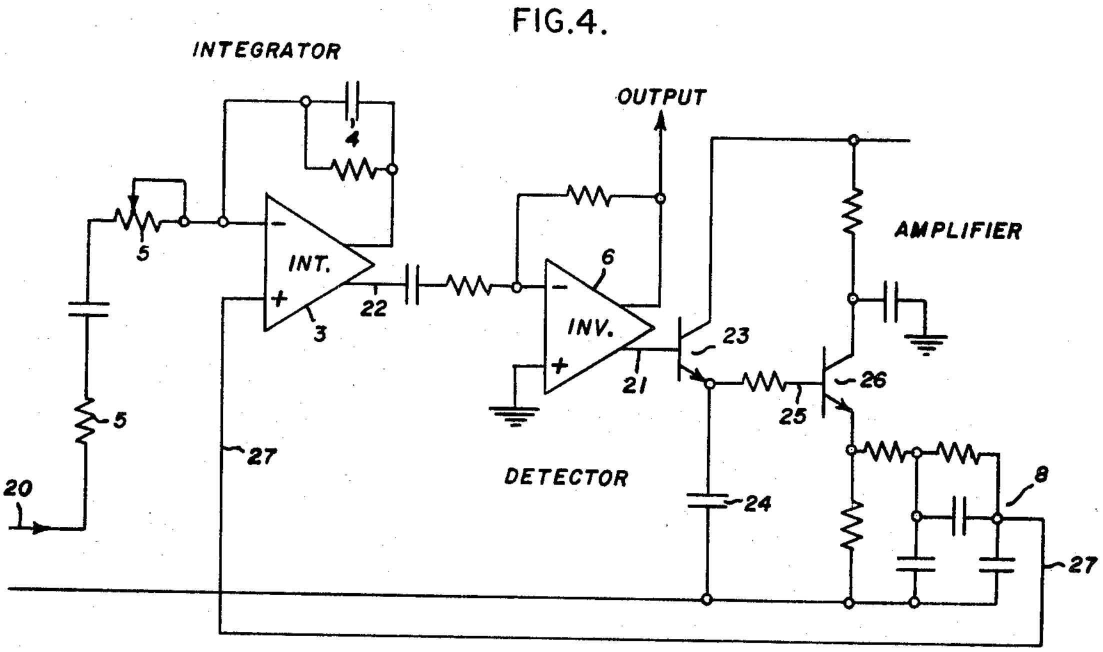
FIG. 4 shows a circuit diagram of a preferred embodiment of the present invention.

Referring to FIG. 4, there is shown in circuit diagram form one embodiment of the present invention. Wherever possible, common reference numerals have been retained. Input signals constituting the ramp input waveform 2 are supplied over lead 20 through the adjustable and fixed resistor combination 5 to one input of the integrator circuit 3. Integrator circuit 3 comprises a differential operational amplifier connected as an integrator. In one embodiment, this comprised a commercially available integrated circuit linear amplifier with two separate inputs and provisions for feedback. Integrator 3 responds to the ramp waveform passed through the potentiometer 5 to provide at its output a series of parabolic waveforms such as 1 in FIG. 1. Of course, in the absence of any undesirable DC error signal on the input waveform, these parabolas have no DC components in them. The circuit operates as an integrator because of the feedback connection through the integrating RC network comprising capacitor 4 and resistor 5. The upper output lead from the amplifier 3 does not invert whereas a lower output lead provides an inverted signal. The parabolic output from integrator 3 is applied to the inverter circuit 6 over lead 22 which produces at its lower output lead 21 an inverted version of the parabolic waveform available on its input lead 22. This corresponds to waveform 9 in FIG. 1 without any undesirable ramp component. In one embodiment, inverter 6 comprised an integrated circuit linear amplifier with two separate inputs and provisions for feedback. With one input grounded and the feedback connection through a resistor properly dimensioned with respect to the resistor connected to the other input, inverter operation with unity gain is achieved. The inverted parabolic waveform available on 21 is then applied to the peak detector circuit 7 comprising a transistor 23 and capacitor 24. The peak detector output available on lead 25 is then supplied through an amplifier comprising transistor 26 to the filter 8. Filter 8 comprises an RC network which operates to remove residual ripple from the peak detector. The filtered peak detector output is applied over lead 27 to the second or + input to the differential amplifier 3 operating as an integrator. The nature of the circuit of FIG. 4 is such that any movement of the positioner control which results in a DC component being introduced into the ramp signal available on lead 20 and applied to the − input of 3 results in a corrective error signal being applied over lead 27 to the other or + input to the differential amplifier 3 to prevent any DC component being produced in the parabolic output signal available on lead 22. By eliminating the undesirable ramp component which would result from any DC component being available on the input lead 20, the resultant output parabolic waveforms can be used to produce constant size circles representing the boundary between different video displays.

The circle size, of course, can be changed by changing the threshold level used for comparison purposes in the circuit, not shown, that develops the switching control voltages as previously described. It is possible also to make some changes in the circle size by adjustment of potentiometer 5.

Thus, the invention as disclosed overcomes deficiencies presently existing in special effects TV video controls in a simpler manner than previously disclosed. With this arrangement, any attempt of the vertical rate parabola to depart from its steady-state conditions is detected and the error voltage is applied in the proper polarity to the second input of the integrator. This means that any DC component introduced by the positioner is cancelled out by introducing an equal amount of DC into the second input of the integrator. The advantage of this method over other methods in use is that the essential simplicity (low noise, automatic repression of the ramp flyback interval and no critical adjustments or parts) of the integrator is retained without its disadvantages. Thus, a circle generator may be provided at low cost and a lack of critical adjustments.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. In a television system, apparatus for switching video signals in a raster scan on a display screen, said apparatus comprising a source of a repetitive AC scanning waveform normally having no DC component, to reference the time of switching of said video signals, variable control means for at will modifying a parameter of said waveform to displace the time of switching of said video signals from the reference time, the modification adding an undesirable DC component to said waveform thereby causing an error in the time displacement of said switching, means responsive to said waveform, including any said modification thereof, for integration thereof to produce switching signals for said video signals, means responsive to a component of the integrated waveform attributable to any said undesirable DC component added by said modification of the original waveform, for developing an inverted version of said DC component, and feedback means for adding said inverted version to the modified waveform to cancel the undesirable DC component therefrom.

2. In the television system of claim 1, said variable control means comprising a control lever movable in a plurality of different directions to correspondingly vary the position of a geometric pattern of the television raster.

3. In the television system of claim 1, said means for developing an inverted version of said DC component comprising an inverter, a peak detector, and a filter, in the order recited.

4. A source of a recurrence ramp input waveform normally having a zero DC signal component, means for integrating said ramp input waveform to produce a recurrent parabolic output waveform, positioner means for modifying the time of occurrence of the ramp in said recurrent ramp input waveform to modify the time of occurrence of the parabola in said produced recurrent parabolic output waveform, said ramp duration modification producing an undesirable ramp component in said modified parabolic output waveform, means for inverting said modified parabolic output waveform to produce an inverted, modified parabolic output waveform, means for peak detecting said inverted, modified parabolic output waveform, means for applying said inverted, modified parabolic output waveform as a negative feedback signal to said means for integrating to provide a desirable output signal comprising said modified parabolic output waveform without said undesirable ramp component, and means for utilizing said desirable output waveform.

5. An arrangement for processing a recurrent ramp waveform whose starting time of occurrence is modifiable comprising means for integrating said ramp waveform to produce a recurrent parabolic waveform, means for substantially eliminating an undesirable ramp component in said recurrent parabolic waveform resulting during changes in said starting time comprising means for inverting a portion of said parabolic waveform with said undesirable ramp component to provide an inverted waveform, means for peak detecting said inverted waveform, and means for applying said inverted waveform as a negative feedback signal to said means for integrating.

6. An arrangement according to claim 5 further comprising means for filtering said inverted waveform before application to said means for integrating.

7. An arrangement according to claim 5 wherein said means for integrating comprises a differential amplifier integrator.

* * * * *